United States Patent
Cigal

(10) Patent No.: US 10,669,877 B2
(45) Date of Patent: Jun. 2, 2020

(54) AIR SEAL ATTACHMENT

(71) Applicant: United Technologies Corporation, Farmington, CT (US)

(72) Inventor: Brian P. Cigal, Windsor, CT (US)

(73) Assignee: United Technologies Corporation, Farmington, CT (US)

(*) Notice: Subject to any disclaimer, the term of this patent is extended or adjusted under 35 U.S.C. 154(b) by 253 days.

(21) Appl. No.: 15/850,179

(22) Filed: Dec. 21, 2017

(65) Prior Publication Data
US 2019/0195079 A1    Jun. 27, 2019

(51) Int. Cl.
| | | |
|---|---|---|
| F01D 11/04 | (2006.01) | |
| F02C 7/28 | (2006.01) | |
| F01D 11/02 | (2006.01) | |
| F16J 15/447 | (2006.01) | |

(52) U.S. Cl.
CPC .............. *F01D 11/04* (2013.01); *F01D 11/02* (2013.01); *F02C 7/28* (2013.01); *F16J 15/4472* (2013.01); *F05D 2240/55* (2013.01); *F05D 2250/182* (2013.01); *F05D 2250/75* (2013.01); *F05D 2260/36* (2013.01); *F05D 2260/38* (2013.01)

(58) Field of Classification Search
CPC .......... F05D 2250/294; F05D 2250/182; F16J 15/4472; F01D 5/026; F01D 11/04; F01D 11/02
See application file for complete search history.

(56) References Cited

U.S. PATENT DOCUMENTS

| | | | |
|---|---|---|---|
| 3,833,273 A | 9/1974 | Rickley et al. | |
| 5,028,054 A | 7/1991 | Peach | |
| 5,173,024 A | 12/1992 | Mouchel et al. | |
| 5,236,302 A * | 8/1993 | Weisgerber | F01D 5/06 415/173.7 |
| 5,288,210 A * | 2/1994 | Albrecht | F01D 5/066 416/198 A |
| 5,320,488 A * | 6/1994 | Meade | F01D 5/025 415/173.7 |
| 7,591,594 B2 * | 9/2009 | Charier | F01D 5/026 384/569 |
| 7,775,723 B2 | 8/2010 | Maffre | |
| 7,837,199 B2 * | 11/2010 | Craig | F01D 11/003 277/370 |
| 8,579,538 B2 * | 11/2013 | Juh | F01D 5/066 403/359.5 |
| 9,309,775 B2 * | 4/2016 | Mastro | F01D 11/003 |
| 2005/0196088 A1 | 9/2005 | Charier et al. | |

(Continued)

OTHER PUBLICATIONS

Extended European Search Report for EP Application No. 18215681. 0, dated May 14, 2019, pp. 8.

*Primary Examiner* — Kenneth Bomberg
*Assistant Examiner* — Hakeem M Abdellaoui
(74) *Attorney, Agent, or Firm* — Kinney & Lange, P.A.

(57) ABSTRACT

A gas turbine engine includes a coupling and an air seal attachment. The annular coupling extends along a centerline and has coupling teeth that extend axially rearward. The annular air seal attachment includes an air seal at an axially rearward end and air seal attachment teeth at an axially forward end that extend axially forward to interlock with the coupling teeth such that the air seal attachment teeth and the coupling teeth alternate in a circumferential direction.

13 Claims, 2 Drawing Sheets

(56) References Cited

U.S. PATENT DOCUMENTS

| | | | |
|---|---|---|---|
| 2007/0098545 A1* | 5/2007 | Alvanos | F01D 5/081 |
| | | | 415/170.1 |
| 2009/0238683 A1* | 9/2009 | Alvanos | F01D 11/001 |
| | | | 415/173.7 |
| 2012/0027598 A1* | 2/2012 | Caprario | F01D 5/082 |
| | | | 416/193 R |
| 2012/0051918 A1* | 3/2012 | Glasspoole | F01D 5/025 |
| | | | 416/204 A |
| 2012/0201658 A1 | 8/2012 | Le Brusq et al. | |
| 2013/0336785 A1* | 12/2013 | Hummel | F01D 5/066 |
| | | | 415/220 |
| 2017/0159469 A1 | 6/2017 | Hubley et al. | |
| 2019/0218921 A1* | 7/2019 | Breen | F01D 5/025 |

* cited by examiner

AIR SEAL ATTACHMENT

BACKGROUND

The present disclosure relates to air seals for a gas turbine engine and, in particular, to an attachment of the air seals to a rotating component that utilizes less axial and radial space within the gas turbine engine.

Gas turbine engines require air seals to provide sealing between rotating and nonrotating components (or components that rotate at a different speed) adjacent high pressure areas within the gas turbine engine. Typically, these air seals are attached to the rotating components using a bolted connection, by being integral with one of the rotating components, or through a fit and trapped connection that requires an annular portion of the air seal to extend a substantial distance along a centerline of the gas turbine engine. However, none of these connections allow for a low-profile attachment (i.e., an attachment that requires very little radial and/or axial space), and these connections may require additional machining and/or complex geometries that are time-consuming and expensive to replace. Thus, an air seal attachment that utilizes little radial and axial space is advantageous.

SUMMARY

A gas turbine engine includes a coupling and an air seal attachment. The annular coupling extends along a centerline and has coupling teeth that extend axially rearward. The annular air seal attachment includes an air seal at an axially rearward end and air seal attachment teeth at an axially forward end that extend axially forward to interlock with the coupling teeth such that the air seal attachment teeth and the coupling teeth alternate in a circumferential direction.

An attachment for attaching an air seal to a shaft includes an air seal that is annular with sealing means on a radially outer side and attachment teeth extending axially forward of the air seal and configured to interlock with corresponding shaft teeth on the shaft.

An air seal arrangement includes a cylindrical coupling extending axially long a centerline and having coupling teeth at an axial rearward end and a seal connection that is annular in shape with a seal at an axially rearward end and connection teeth at an axially forward end configured to interlock with the coupling teeth to prevent movement of the seal connection relative to the coupling.

DETAILED DESCRIPTION

An air seal attachment is disclosed. The air seal attachment uses axially extending teeth that circumferentially interlock with corresponding axially extending teeth on a rotating coupling to prevent circumferential and bending movement of the air seal attachment relative to the coupling. Both the coupling and the air seal attachment include radially inward extending tabs to form a groove configured to house a retaining ring to prevent axial movement of the air seal attachment relative to the coupling. Additionally, the air seal attachment can include axially extending pilot arms that slide into slots in the coupling to provide increased prevention of circumferential and bending movement while also decreasing radial leakage of air between the air seal attachment and the coupling. An alternate embodiment of the pilot arms is a shell connected to the air seal attachment and radially outward from the interlocking teeth. The shell encircles the coupling teeth and the air seal attachment teeth to provide a barrier that decreases radial leakage. Because the air seal attachment connects to the coupling through the use of axially-extending teeth, no additional radial space and very little axial space is needed within the gas turbine engine to utilize the air seal attachment to provide an air seal along the coupling.

Figure 1:
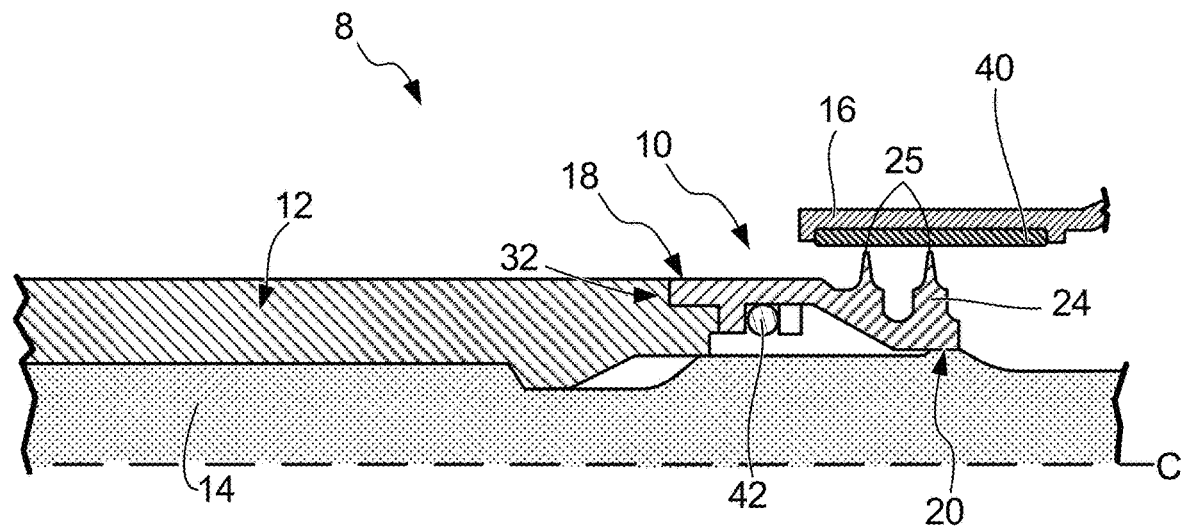
FIG. 1 is a cross-sectional side view of an air seal attachment interlocked with a coupling.
Figure 2A:
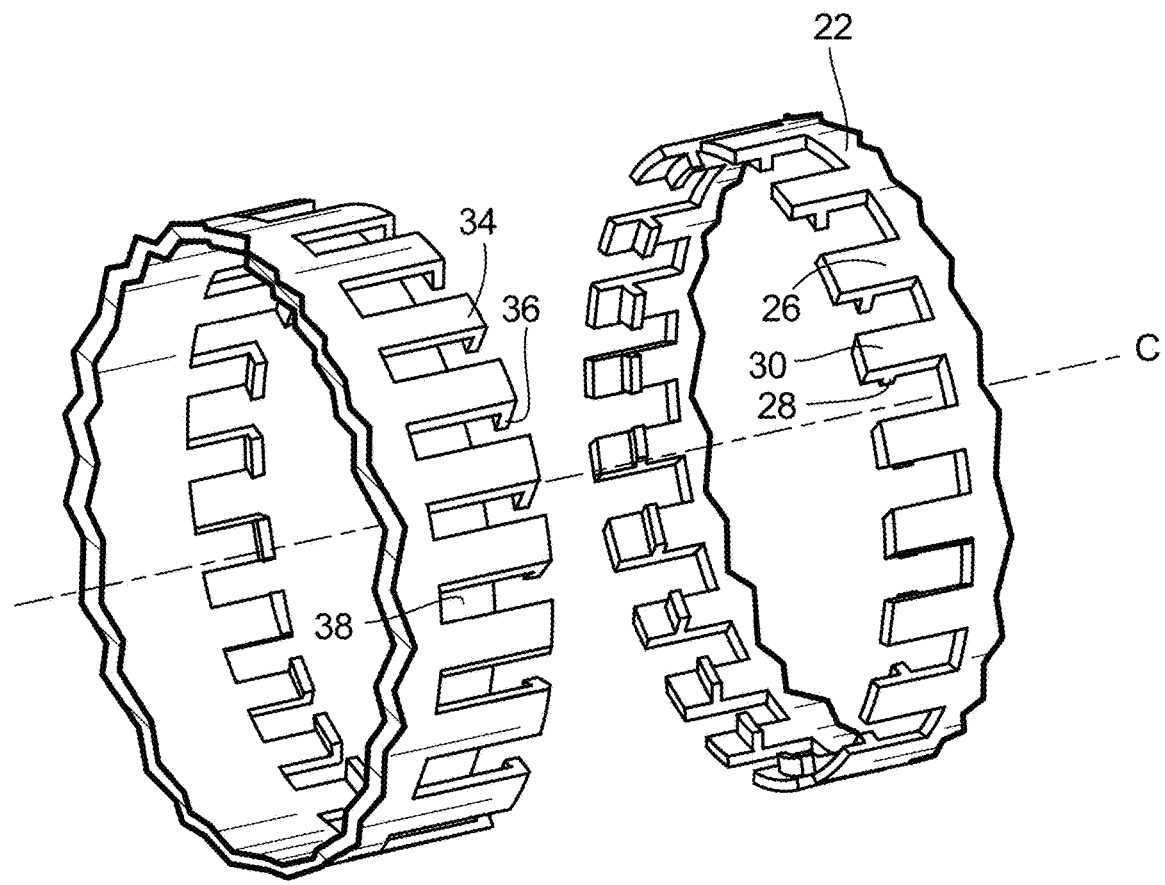
FIG. 2A is a perspective view of the air seal attachment remote from the coupling.
Figure 2B:
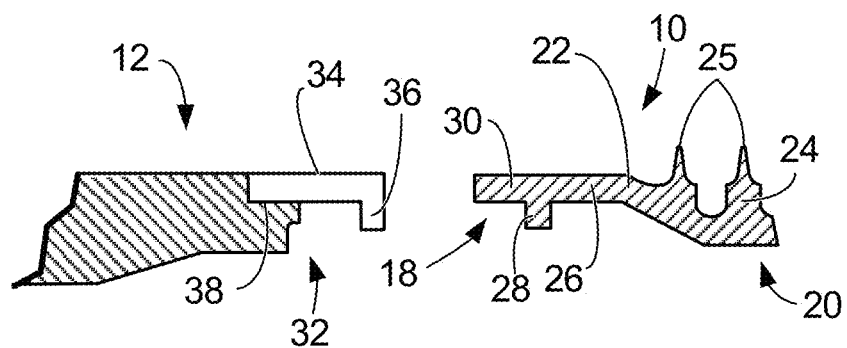
FIG. 2B is a partial cross-sectional side view of the air seal attachment and coupling remote from one another.

FIG. 1 is a cross-sectional side view of a portion of gas turbine engine 8 having air seal attachment 10 interlocked with coupling 12 with air seal attachment 10 radially between rotating shaft 14 and land 16. FIG. 2A is a partial perspective view of air seal attachment 10 decoupled from coupling 12, while FIG. 2B is a partial cross-sectional view of air seal attachment 10 decoupled from coupling 12. Air seal attachment 12 includes forward end 18, rearward end 20, ring 22, air seal 24, air seal attachment teeth (hereafter "ASA" teeth) 26, air seal attachment tabs (hereafter "ASA" tabs) 28, and pilot arms 30. Coupling 12 includes rearward end 32, coupling teeth 34, coupling tabs 36, and slots 38. Shaft 14 extends axially along centerline C and is at least partially radially inward from air seal attachment 10 and coupling 12. Land 16 includes sealing surface 40. Radially inward from ASA teeth 26 and coupling teeth 34 is retaining ring 42.

Gas turbine engine 8 extends along centerline C and can be an industrial engine, an aircraft engine, or another type of engine. Further, while the disclosure includes air seal attachment 10 and coupling 12 with reference to their placement within gas turbine engine 8, the disclosed invention can be utilized in a variety of other systems, including other types of engines. Gas turbine engine 8 includes substantially cylindrical shaft 14 extending axially along centerline C. Shaft 14 is configured to rotate and, in turn, rotates coupling 12 and air seal attachment 10. While the disclosure includes air seal attachment 10 interlocking with coupling 12, other embodiments can include a configuration in which air seal attachment 10 interlocks with teeth, tabs, and slots in shaft 14. Shaft 14 can include other features, such as grooves or projections, that allow for coupling of shaft 14 to coupling 12, air seal attachment 10, and/or other components of gas turbine engine 8.

Land 16 is an annular member radially outward from air seal attachment 10. Land 16 can be configured to be non-rotating in relation to air seal attachment 10, coupling 12, and shaft 14. Alternatively, land 16 also can be configured to rotate about centerline C. Land 16 can include sealing surface 40, which is adjacent air seal 24. Sealing surface 40 of land 16 can be in close proximity with, or occasionally in contact with, air seal 24 to provide sealing to limit the amount of air or another fluid that flows between land 16 and air seal 24. Land 16 can be annular in shape or have another configuration as is necessary to fit within gas turbine engine 8 and provide sealing surface 40.

Coupling 12 is substantially annular in shape and radially outward from shaft 14. Coupling 12 is coupled/connected to shaft 14 and is configured to rotate in unison with shaft 14 circumferentially about centerline C. Coupling 12 can have grooves, projections, and/or other features on a radially outer side and/or on a radially inner side to allow for attachment of coupling 12 to shaft 14 and/or other components of gas turbine engine 8. While not shown, an axially forward end of coupling 12 can extend axially forward a large or small distance depending on the configuration of gas turbine engine 8. At rearward end 32 of coupling 12, coupling 12 includes coupling teeth 34 adjacent to and interlocked with ASA teeth 26 of air seal attachment 10.

Coupling teeth 34 are axially rearward extending components that are circumferentially spaced around annular coupling 12. Coupling teeth 34 can extend a variety of axial lengths, but a length of each of coupling teeth 34 should be similar to a length of ASA teeth 26 such that a rearward end of coupling teeth 34 abuts ring 22 of air seal attachment 10 to form a tight fit with little gap therebetween. Further, a circumferential width of coupling teeth 34 should be similar to a circumferential distance between ASA teeth 26 so that coupling teeth 34 and ASA teeth 26 interlock with very little or no gap between adjacent alternating teeth to limit an amount of air/fluid that can flow between adjacent alternating teeth. Coupling 12 can have any number of coupling teeth 34 that are spaced circumferentially around coupling 12, and the spacing between coupling teeth 34 can be constant or varied to match the width of corresponding ASA teeth 26.

Coupling tabs 36 (also referred to as coupling flanges) extend radially inward from rearward end 32 of each of coupling teeth 34. As described below, coupling tabs 36 function along with ASA tabs 28 and retaining ring 42 to prevent axial movement of air seal attachment 10 relative to coupling 14. When installed, ASA tabs 28 form a forward wall, ASA teeth 26 and coupling teeth 34 form an outer surface, and coupling tabs 36 form a rearward wall of a groove within which retaining ring 42 is located. With coupling tabs 36 adjacent retaining ring 42, air seal attachment 10 cannot be pulled axially rearward because retaining ring 42 will contact coupling tabs 36 (and ASA tabs 28) and resist axial movement. Coupling tabs 36 can extend any distance radially inward to provide a sufficient contact surface for retaining ring 42.

Retaining ring 42 is an annular retaining component that is located within the groove formed by coupling tabs 36 and ASA tabs 28. Retaining ring 42 extends circumferentially within the groove centered about centerline C. Retaining ring 42 can be a split ring having one discontinuity that allows for retaining ring 42 to be manipulated into the groove during installation. However, retaining ring 42 can be another type of retaining component suitable to prevent air seal attachment 10 from being pulled axially away from coupling 12. While retaining ring 42 is shown as having a circular cross section, retaining ring 42 can have another cross-sectional configuration, such as a square or rectangle, that provides increased retaining means by forming a tight fit within the groove.

Coupling 12 can also include slots 38 on the radially outer side axially forward from coupling teeth 34 but circumferentially spaced between coupling teeth 34. Slots 38 are configured to accommodate pilot arms 30 of air seal attachment 10, and can provide additional support for radial positioning of air seal attachment 10. Slots 38 should have an axial length similar to an axial length of pilot arms 30 to provide a tight fit between the two components, and slots 38 should not extend radially inward an entire radial width of coupling 12. Additionally, slots along with pilot arms 30 may be configured to provide additional sealing to limit air/fluid from flowing between coupling 12 and air seal attachment 10. Further, a sealant can be utilized between coupling teeth 34 and ASA teeth 26 to provide additional sealing between the components. This sealant can be any type of sealant suitable to prevent the flow of air/fluid between air seal attachment 10 and coupling 12.

Air seal attachment 10 (also referred to as a seal connection) is substantially annular in shape and axially rearward from coupling 12. Air seal attachment 10 is radially outward from shaft 14 and is at least partially radially inward from land 16 (to which air seal 24 of air seal attachment 10 seals). Air seal attachment 10 extends axially along centerline C from forward end 18 (adjacent coupling 12) to rearward end 20 (radially inward and adjacent land 16). Air seal attachment 10 is configured to rotate in unison with coupling 12 and shaft 14. Air seal attachment 10 can have grooves, projections, and/or other features on a radially outer side and/or a radially inner side to allow for attachment of air seal attachment 10 to shaft 14 and/or other components of gas turbine engine 8. While air seal attachment 10 is substantially annular in shape, all or a portion of air seal attachment 10 can have a frustoconical shape such that the radially inner side of air seal attachment 10 at rearward end 18 has a smaller diameter than a diameter of the radially inner side of air seal attachment 10 at forward end 20. Further, air seal attachment 10 can have other configurations, such as a stair-step configuration on the radially inner side. Air seal attachment 10 can be constructed from any material able to handle the stresses/forces imparted on air seal attachment 10 due to rotation, high temperatures, high pressures, and other components within gas turbine engine 8. Exemplary materials are steel alloys, nickel alloys, titanium alloys, a plastic, a composite, or combinations thereof.

Air seal attachment 10 includes annular ring 22 axially between air seal 24 at rearward end 20 and ASA teeth 26, ASA tabs 28, and pilot arms 30 at forward end 18. Ring 22 connects ASA teeth 26 to air seal 24. Some embodiments of air seal attachment 10 do not need to include ring 22 as air seal 24 can connect directly to ASA teeth 26. Ring 22 and the other components of air seal attachment 10 can be as radially thick as necessary to withstand the forces/stresses imparted on air seal attachment 10.

Air seal 24 is connected to ring 22 and is at rearward end 18 of air seal attachment 10. Air seal 24 can be any type of seal configured to seal between a rotating component (e.g., air seal attachment 10, coupling 12, and shaft 14) and either a nonrotating component or a component rotating at a different speed (e.g., land 16). However, as shown in the disclosed embodiments, air seal 24 is a labyrinth air seal that includes two radially outward extending knife edges 25 that are in contact with and seal to sealing surface 40 of land 16. If necessary, air seal 24 can extend axially rearward a greater distance than that shown in the disclosed embodiments to accommodate more knife edges 25 or to accommodate other configurations/types of seals.

ASA teeth 26 (also referred to as connection teeth) extend axially forward at forward end 18 of air seal attachment 10 to interlock with coupling teeth 34 to prevent circumferential movement and bending of air seal attachment 10 relative to coupling 12. When installed, ASA teeth 26 and coupling teeth 34 alternate in a circumferential direction so that air seal attachment 10 and coupling 12 rotate in unison. As with coupling teeth 34, ASA teeth 26 can extend a variety of axial lengths but should be similar in length to coupling teeth 34.

Further, a circumferential width of ASA teeth 26 should be similar to a circumferential distance between coupling teeth 34 so that ASA teeth 26 and coupling 34 interlock with very little or no gap between adjacent alternating teeth. Air seal attachment 10 can have any number of ASA teeth 26 that are spaced circumferentially around air seal attachment 10, and the spacing between ASA teeth 26 can be constant or varied to match the width of corresponding coupling teeth 26.

ASA tabs 28 (also referred to as connection flanges) extend radially inward from each of ASA teeth 26. ASA tabs 28, in conjunction with coupling tabs 36 and retaining ring 42, prevent axial movement of air seal 10 relative to coupling 14. When installed, ASA tabs 28 are axially forward of coupling tabs 36 to form a groove along with coupling tabs 36, ASA teeth 26, and coupling teeth 34 within which retaining ring 42 is located. With ASA tabs 28 adjacent retaining ring 42, air seal attachment 10 cannot be pulled axially rearward because retaining ring 42 will contact ASA tabs 28 (and coupling tabs 36) and resist axial movement. ASA tabs 28 can extend any distance radially inward to provide a sufficient contact surface for retaining ring 42.

Pilot arms 30 extend axially forward from ASA teeth 26 at forward end 18. Pilot arms 30 are configured to be located within respective slots 38 in coupling 12. Pilot arms 30 in conjunction with slots 38 can provide additional support for radial positioning of air seal attachment relative to coupling 12. Further, pilot arms 30 along with slots 38 can provide increased prevention of circumferential and bending movement between the two components. Pilot arms 30 should have an axial length similar to the axial length of slots 38 to provide a tight fit between the two components, and pilot arms 30 can have a radial thickness that matches the radial depth of slots 38 to provide a smooth transition between coupling 12 and air seal attachment 10 on the radially outer side of the two components at the interface between slots 38 and pilot arms 30. This smooth transition can result in increased efficiency by reducing drag on the rotating coupling 12 and air seal attachment 10. The interface between air seal attachment 10 and coupling 12 can have other configurations to limit radial leakage of air/fluid, such as a shell (discussed with regards to FIGS. 3A and 3B) or another configuration.

Air seal attachment 10 and coupling 12 utilize axially extending teeth (axially rearward extending coupling teeth 34 and axially forward extending ASA teeth 26) that interlock to prevent circumferential and bending movement of air seal attachment 10 relative coupling 12. Both air seal attachment 10 and coupling 12 include radially inward extending tabs (ASA tabs 28 and coupling tabs 36) that form a groove within which retaining ring 42 is located to prevent axial movement of air seal attachment 10 relative to coupling 12. Air seal attachment 10 can also include axially forward extending pilot arms 30 that are located within slots 38 in coupling 12 to provide increased prevention of circumferential and bending movement while also decreasing radial leakage of air/fluid between ASA teeth 26 and coupling teeth 34. Other configurations can be utilized to decrease radial leakage between ASA teeth 26 and coupling teeth 34, such as the embodiment shown in FIGS. 3A and 3B.

Figure 3A:
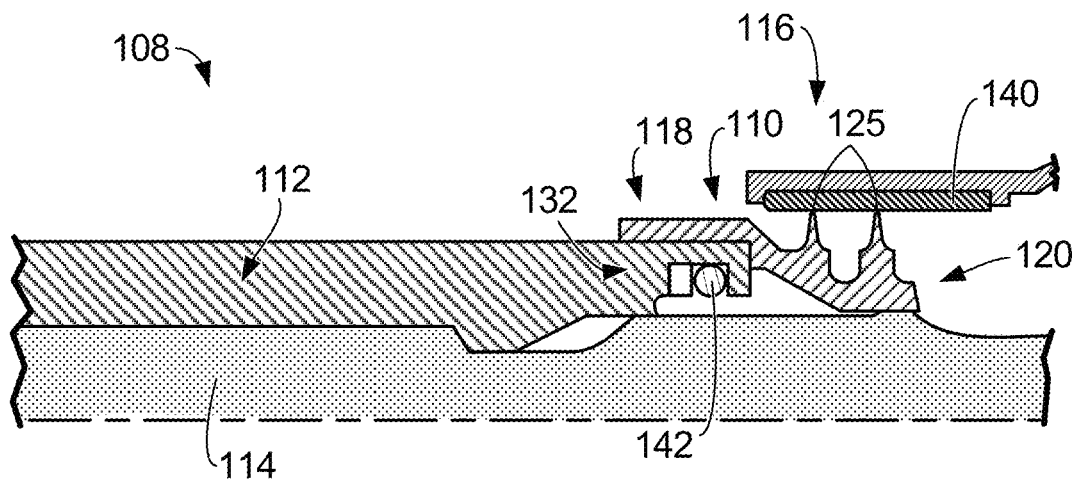
FIG. 3A is a cross-sectional side view of a second embodiment of the air seal attachment interlocked with the coupling.
Figure 3B:
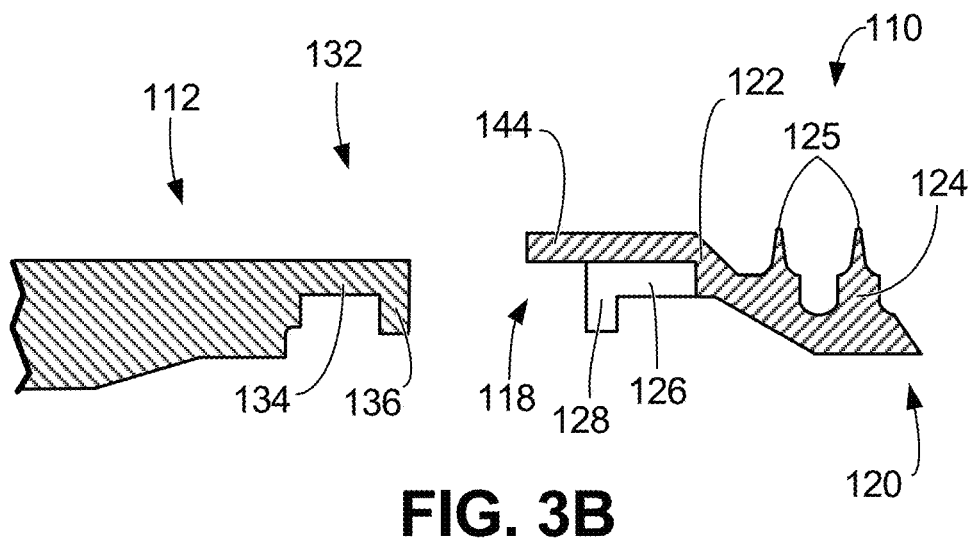
FIG. 3B is a partial cross-sectional view of the second embodiment of the air seal attachment and coupling remove from one another.

FIG. 3A is a cross-sectional side view of a second embodiment of a portion of gas turbine engine 108 having air seal attachment 110 interlocked with coupling 112, while FIG. 3B is a partial cross-sectional view of air seal attachment 110 decoupled from coupling 112. The configuration and functionality of gas turbine engine 108 with air seal attachment 110 and coupling 112 is similar to that of gas turbine engine 8 in FIGS. 1, 2A, and 2B. However, air seal attachment 110 does not include pilot arms but rather includes shell 144 radially outward from ASA teeth 126. Additionally, coupling 112 does not include any slots. Similar to air seal attachment 10 in FIGS. 1, 2A, and 2B, air seal attachment 110 includes forward end 118, rearward end 120, ring 122, air seal 124, knife edges 125, ASA teeth 126, and ASA tabs 128. Similar to coupling 12 in FIGS. 1, 2A, and 2B, coupling 112 includes rearward end 132, coupling teeth 134, and coupling tabs 136. Gas turbine engine 108 also includes shaft 14 extending along centerline C and land 116 with sealing surface 140 radially outward from air seal 124. Radially inward from ASA teeth 126 and coupling teeth 132 is retaining ring 142. As mentioned above, air seal attachment 110 further includes shell 144 radially outward from ASA teeth 126 and ASA tabs 128.

Shell 144 of air seal attachment 110 is annular and located radially outward from ASA teeth 126 (and coupling teeth 134 when air seal attachment 110 is installed adjacent coupling 112). Shell 144 extends axially forward at forward end 118 of air seal attachment 110 to be radially outward from a rearward portion of coupling 112 to decrease radial leakage between ASA teeth 126 and coupling teeth 134. Shell 144 can have any radial thickness that aids in preventing air/fluid from leaking between the two components. Shell 144 can extend circumferentially entirely around air seal attachment 110, or shell 144 can have circumferential gaps such that shell 144 is not present radially outward from ASA teeth 126. Shell 144 should be sized and shaped to have a tight fit with little clearance with coupling 112 to minimize a gap between air seal attachment 110 and coupling 112. As mentioned above, because air seal attachment 110 does not include pilot arms, coupling 112 does not include corresponding slots into which the pilot arms extend. Rather, shell 144 radially outward from the interlocking ASA teeth 126 and coupling teeth 134 aids in limiting radial leakage between air seal attachment 110 and coupling 112.

The disclosed configuration of air seal attachment 10/110 interlocked with coupling 12/112 to provide air seal 24/124 utilizes very little axial and radial space within an area of gas turbine engine 8/108 where space is limited. Air seal attachment 10/110 does not require additional machining (as is needed with a bolted connection) and/or complex geometries that are time-consuming and expensive if replacement of air seal 24/124 is needed. Installation of air seal attachment 10/110 adjacent coupling 12/112 is quick and easy, as air seal attachment 110 slides onto shaft 14/114 to interlock with coupling teeth 34/134 with retaining ring 42/142 then being inserted into the groove formed by ASA tabs 28/128 and coupling tabs 36/136. Additionally, the configuration of air seal attachment 10/110 interlocked with coupling 12/112 prevents circumferential, axial, and bending movement relative to one another (while still allowing the components to rotate in unison with shaft 14/114).

Discussion of Possible Embodiments

The following are non-exclusive descriptions of possible embodiments of the present invention.

A gas turbine engine includes a coupling and an air seal attachment. The annular coupling extends along a centerline and has coupling teeth that extend axially rearward. The annular air seal attachment includes an air seal at an axially rearward end and air seal attachment teeth at an axially forward end that extend axially forward to interlock with the coupling teeth such that the air seal attachment teeth and the coupling teeth alternate in a circumferential direction.

The gas turbine engine of the preceding paragraph can optionally include, additionally and/or alternatively, any one or more of the following features, configurations and/or additional components:

Coupling tabs extending radially inward from the coupling teeth and air seal attachment tabs extending radially inward from the air seal attachment teeth with the air seal attachment tabs being axially forward of the coupling tabs.

A retaining ring radially inward from the coupling teeth and the air seal attachment teeth with the retaining ring being axially forward of the coupling teeth and axially rearward of the air seal attachment teeth to prevent axial movement of the air seal attachment relative to the shaft.

Slots on a radially outer side of the coupling circumferentially between the coupling teeth and pilot arms of the air seal attachment extending axially forward from the air seal attachment teeth with the pilot arms configured to be located within respective slots in the coupling.

The air seal attachment further includes a shell extending axially forward and radially outward from the air seal attachment teeth with the shell configured to be radially outward from the coupling teeth when the air seal attachment teeth are interlocked with the coupling teeth.

The air seal is a labyrinth air seal.

The labyrinth air seal can include at least two knife edges.

A land radially outward from the air seal.

A sealant between the coupling teeth and the air seal attachment teeth.

A shaft radially coupled to the coupling.

An attachment for attaching an air seal to a shaft includes an air seal that is annular with sealing means on a radially outer side and attachment teeth extending axially forward of the air seal and configured to interlock with corresponding shaft teeth on the shaft.

The attachment of the preceding paragraph can optionally include, additionally and/or alternatively, any one or more of the following features, configurations and/or additional components:

Attachment tabs extending radially inward from the attachment teeth.

Pilot arms extending axially forward from the attachment teeth.

The sealing means is a labyrinth air seal.

A radially inner side of the air seal has a smaller diameter than a radially inner side of the attachment teeth.

An air seal arrangement includes a cylindrical coupling extending axially long a centerline and having coupling teeth at an axial rearward end and a seal connection that is annular in shape with a seal at an axially rearward end and connection teeth at an axial forward end configured to interlock with the coupling teeth to prevent movement of the seal connection relative to the coupling.

The air seal arrangement of the preceding paragraph can optionally include, additionally and/or alternatively, any one or more of the following features, configurations and/or additional components:

Coupling flanges that extend radially inward from an axially rearward end of the coupling teeth.

Connection flanges that extend radially inward from an axially forward end of the connection teeth such that the connection flanges are axially forward of the coupling flanges when the coupling teeth and connection teeth are interlocked.

A retaining ring radially inward from the coupling teeth and the connection teeth axially between the coupling flanges and the connection flanges to prevent axial movement of the seal connection relative to the coupling.

Slots on a radially outer side of the coupling at the axial rearward end circumferentially between the coupling teeth.

Arms at the axial forward end of the seal connection extending forward from the connection teeth and configured to be within the slots when the coupling teeth and connection teeth are interlocked.

A shell that is annular in shape at the axial forward end and configured to be radially outward from the connection teeth and the coupling teeth when the coupling teeth and connection teeth are interlocked.

A sealant between the coupling teeth and the connection teeth to aid in preventing air from flowing between the coupling teeth and the connection teeth.

While the invention has been described with reference to exemplary embodiments, it will be understood by those skilled in the art that various changes may be made and equivalents may be substituted for elements thereof without departing from the scope of the invention. Although a number of embodiments have been described above, other implementations, modifications, and variants are possible in light of forgoing teachings. For example, while described above as being used for sealing applications, the coupling, air seal attachment, etc. and disclosed concepts/teachings may also be implemented/utilized for non-sealing applications, such as for instrument mounting or the like. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine comprising:
   an annular coupling extending along a centerline and having coupling teeth that extend axially rearward;
   an annular air seal attachment comprising:
   an air seal at an axially rearward end;
   air seal attachment teeth at an axially forward end that extend axially forward to interlock with the coupling teeth such that the air seal attachment teeth and the coupling teeth alternate in a circumferential direction; and
   pilot arms extending axially forward from the air seal attachment teeth; and
   slots on a radially outer side of the coupling circumferentially between the coupling teeth, wherein the pilot arms are configured to be located within respective slots in the coupling.

2. The gas turbine engine of claim 1, further comprising:
   coupling tabs extending radially inward from the coupling teeth; and
   air seal attachment tabs extending radially inward from the air seal attachment teeth with the air seal attachment tabs being axially forward of the coupling tabs.

3. The gas turbine engine of claim 2, further comprising:
   a retaining ring radially inward from the coupling teeth and the air seal attachment teeth, the retaining ring being axially forward of the coupling teeth and axially rearward of the air seal attachment teeth to prevent axial movement of the air seal attachment relative to the shaft.

4. The gas turbine engine of claim 1, wherein the air seal attachment further comprises:
   a shell extending axially forward and radially outward from the air seal attachment teeth, the shell configured to be radially outward from the coupling teeth when the air seal attachment teeth are interlocked with the coupling teeth.

5. The gas turbine engine of claim 1, wherein the air seal is a labyrinth air seal.

6. The gas turbine engine of claim 5, wherein the labyrinth air seal includes at least two knife edges.

7. The gas turbine engine of claim 1, further comprising: a land radially outward from the air seal.

8. The gas turbine engine of claim 1, further comprising: sealant between the coupling teeth and the air seal attachment teeth.

9. The gas turbine engine of claim 1, further comprising: a shaft radially coupled to the coupling.

10. An air seal arrangement comprising:
a cylindrical coupling extending axially long a centerline and having coupling teeth at an axial rearward end;
slots on a radially outer side of the coupling at the axial rearward end circumferentially between the coupling teeth;
a seal connection that is annular in shape and has a seal at an axially rearward end and connection teeth at an axially forward end configured to interlock with the coupling teeth to prevent movement of the seal connection relative to the coupling; and
arms at the axial forward end of the seal connection extending forward from the connection teeth and configured to be within the slots when the coupling teeth and connection teether are interlocked.

11. The air seal arrangement of claim 10, further comprising:
coupling flanges that extend radially inward from an axially rearward end of the coupling teeth;
connection flanges that extend radially inward from an axially forward end of the connection teeth such that the connection flanges are axially forward of the coupling flanges when the coupling teeth and connection teeth are interlocked; and
a retaining ring radially inward from the coupling teeth and the connection teeth axially between the coupling flanges and the connection flanges to prevent axial movement of the seal connection relative to the coupling.

12. The air seal arrangement of claim 10, wherein the seal connection comprises:
a shell that is annular in shape at the axial forward end and configured to be radially outward from the connection teeth and the coupling teeth when the coupling teeth and connection teeth are interlocked.

13. The air seal arrangement of claim 10, further comprising:
sealant between the coupling teeth and the connection teeth to aid in preventing air from flowing between the coupling teeth and the connection teeth.

* * * * *